UNITED STATES PATENT OFFICE.

HANS T. CLARKE, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION.

1,405,490.  Specification of Letters Patent.  Patented Feb. 7, 1922.

No Drawing.  Application filed February 25, 1921. Serial No. 447,801.

*To all whom it may concern:*

Be it known that I, HANS T. CLARKE, a subject of the King of Great Britain, residing at Rochester, in the county of Monroe and State of New York, have invented certain new and useful Improvements in Cellulose-Ether Compositions, of which the following is a full, clear, and exact specification.

This invention relates to a cellulose ether composition containing ingredients which enable it to be suitably manipulated and utilized in the plastic and analogous arts, such, for instance, as sheet or film manufacture and varnish manufacture.

One object of this invention is to produce a composition which may be made into permanently transparent, strong and flexible sheets of suitable thinness that are substantially waterproof, are unaffected by ordinary photographic fluids, and in general possess the desirable properties of a support for sensitive photographic coatings. Other objects will hereinafter appear.

I have discovered that such a composition can be prepared by compounding ethers of the variety indicated in U. S. Patent No. 1,188,376, Lilienfeld, June 20, 1916, with benzoates of the higher aliphatic alcohols, such as normal butyl benzoate, amyl benzoate and isobutyl benzoate. The ingredients are combined by the use of a common solvent.

For instance, I may select ethyl cellulose of the kind that is insoluble in water and does not shrink to an undesirable amount in the photographic manipulations. To 100 parts of this ethyl cellulose I add 300 to 800 (say 500) parts of a mixture of benzol and ethyl alcohol, or any equivalent volatile solvent, and also add from 1 to 100 (say 50) parts of normal butyl benzoate. The substances are mixed until a homogeneous composition results. The ingredients are of the commercial grades, being purified sufficiently to insure the proper degree of transparency and comparative freedom from color in the finished product.

The solutions may be varied considerably, so as to flow at different rates for different uses. The example hereinabove given illustrates a dope that may be flowed under the usual film manufacturing conditions. When spread in the customary manner, the volatile solvents evaporate sufficiently to leave a suitable film containing enough of the benzoate to possess the characteristic properties imparted by the latter. All the hereinabove mentioned benzoates are of low volatility and act in a similar manner.

Having thus described my invention, what I claim as new and desire to secure by Letters Patent is:

1. A composition of matter comprising a cellulose ether and a benzoic acid ester of a monohydroxy aliphatic alcohol having from 4 to 5 carbon atoms.

2. A composition of matter comprising ethyl cellulose and a benzoic acid ester of a monohydroxy aliphatic alcohol having from 4 to 5 carbon atoms.

3. A composition of matter comprising ethyl cellulose and normal butyl benzoate.

4. A flowable film-forming composition comprising a cellulose ether, a benzoic acid ester of a monohydroxy aliphatic alcohol having from 4 to 5 carbon atoms, and a solvent common to both.

5. A composition of matter comprising ethyl cellulose, normal butyl benzoate and a common solvent.

6. A composition of matter comprising ethyl cellulose, normal butyl benzoate, benzol and ethyl alcohol.

7. A composition of matter comprising 100 parts of ethyl cellulose, 300 to 800 parts of a solvent containing benzol and ethyl alcohol and 1 to 100 parts of a benzoic acid ester of a monohydroxy aliphatic alcohol having from 4 to 5 carbon atoms.

8. As an article of manufacture, a sheet of deposited or flowed cellulose ether containing a benzoic acid ester of a monohydroxy aliphatic alcohol having from 4 to 5 carbon atoms.

9. As an article of manufacture, a sheet of deposited or flowed ethyl cellulose containing normal butyl benzoate.

Signed at Rochester, New York, this 17th day of February, 1921.

HANS T. CLARKE.